United States Patent
Steere, III et al.

(10) Patent No.: US 6,473,987 B1
(45) Date of Patent: Nov. 5, 2002

(54) METHOD FOR MEASURING WAFER THICKNESS

(75) Inventors: Robert E. Steere, III, Boonton, NJ (US); Colby Steere, Parsippany, NJ (US)

(73) Assignee: Accretech USA, Inc., Oakland, NJ (US)

( * ) Notice: Subject to any disclaimer, the term of this patent is extended or adjusted under 35 U.S.C. 154(b) by 0 days.

(21) Appl. No.: 09/473,319

(22) Filed: Dec. 28, 1999

(51) Int. Cl.$^7$ ................................................. G01B 5/00
(52) U.S. Cl. ............................. 33/783; 33/784; 33/832; 33/549
(58) Field of Search .......................... 33/412, 832, 833, 33/529, 613, 645, 549, 550, 551, 552, 555, 792, 783, 784, 793, 791, 803, 805, 806; 248/542, 550; 451/6

(56) References Cited

U.S. PATENT DOCUMENTS

| | | | | |
|---|---|---|---|---|
| 4,251,922 A | * | 2/1981 | Perlotto ..................... | 33/181 R |
| 4,326,336 A | * | 4/1982 | Hreha ....................... | 33/172 B |
| 4,464,840 A | * | 8/1984 | Newland ..................... | 33/783 |
| 4,607,436 A | * | 8/1986 | Clay ......................... | 33/783 |
| 4,941,269 A | * | 7/1990 | Mori et al. .................. | 33/783 |
| 4,953,306 A | * | 9/1990 | Weckenmann et al. ...... | 33/1 M |
| 5,009,512 A | * | 4/1991 | Lessi et al. .................... | 33/783 |
| 5,012,592 A | * | 5/1991 | Greenslade .................. | 33/833 |
| 5,022,267 A | * | 6/1991 | Shattuck et al. .............. | 33/784 |
| 5,029,402 A | * | 7/1991 | Lazecki et al. ............... | 33/784 |
| 5,329,733 A | * | 7/1994 | Steere, Jr. ..................... | 451/10 |
| 5,679,060 A | * | 10/1997 | Leonard et al. ............... | 451/43 |
| 5,735,055 A | * | 4/1998 | Hochbein et al. ............. | 33/783 |
| 6,119,358 A | * | 9/2000 | Haensch ...................... | 33/783 |
| 6,212,786 B1 | * | 4/2001 | Naoi ........................... | 33/551 |
| 6,290,569 B1 | * | 9/2001 | Mizuno et al. ................ | 451/5 |

\* cited by examiner

*Primary Examiner*—Diego Gutierrez
*Assistant Examiner*—Madeline Gonzalez
(74) *Attorney, Agent, or Firm*—Francis C. Hand, Esq.; Carella, Byrne, et al.

(57) ABSTRACT

A wafer edge grinding or polishing machine is provided with a pair of chucks for engaging a wafer therebetween, a fixed reference surface and a sensor which is movable with a movable chuck. Measurements are made by the sensor relative to the fixed reference plane when the movable chuck is in engagement with the opposite chuck without a wafer therebetween in order to obtain a standard measurement value. With a wafer between the chucks, the sensor obtains an actual measurement value relative to the fixed reference surface. A calculator determines the difference between the standard and actual measurements values and displays the difference as the thickness of the wafer. Multiple sensors may be used to obtain multiples readings which are averaged by the calculator to obtain a thickness measurement.

19 Claims, 2 Drawing Sheets

METHOD FOR MEASURING WAFER THICKNESS

This invention relates to an apparatus and method for measuring the thickness of a wafer. More particularly, this invention relates to an apparatus and method for measuring the thickness of a wafer on an edge grinding or edge polishing machine.

As is known, edge grinding machines and edge polishing machines are typically constructed so that the peripheral edge of a wafer may be ground or polished during rotation of the wafer about a fixed axis. From time to time, it becomes necessary to measure the thickness of the wafer along the edge, for example to determine the degree of grinding/ polishing.

Heretofore, various types of measuring techniques have been employed for measuring the thickness of a wafer on a edge grinder in order to determine if the "desired degree of grinding" or polishing has been achieved. For example, some techniques have employed devices which rely upon contact with the wafer while other techniques employ non-contact devices.

The contact type of measurement is typically performed by holding the bottom surface of the wafer to be measured against a reference plane and then moving a small spherical surface or stylus into contact with the top surface of the wafer. In such cases, a linear transducer generally follows the position of the stylus and uses the contact position to calculate the wafer thickness. However, one problem with this technique is that only a single point contact is used to obtain a measurement of the overall thickness of the wafer. Should the wafer have a varying thickness at different points, a single point contact reading may well be inaccurate. Furthermore, small areas of contact can scratch, fracture or chip the wafer and thus are not cost-effective from this standpoint.

The non-contact type of measurement typically use capacitance sensors, optical sensors and air followers to obtain a measurement of thickness. The capacitive and optical sensors usually take their measurements from a fixed location above the wafer. On the other hand, the air followers typically measure the displacement of a following head of the edge grinding machine as the head moves to the wafer. These techniques may employ one or two sensors. In the case of two sensors, one is located above the wafer and the other directly below. In the case of using only one sensor, the bottom surface of the wafer is held against a reference plane and the distance to the top surface of the wafer is measured.

Capacitive sensors, however, are not able to accurately measure the thickness of wafers which vary in resistivity. Wafers made of glass, various compound semi-conductors and wafers with devices on them are examples of varying resistivity that the capacitive sensors have problems reading.

Optical sensors have problems reading wafers that are transparent or reflect their emitted light beam.

Air follower techniques can measure all types of wafers but require more maintenance and typically are less accurate than the capacitive or optical sensors.

Accordingly, it is an object of the invention to provide a relatively simple apparatus and method for measuring the thickness of a wafer on an edge grinding machine or an edge polishing machine.

It is another object of the invention to provide a simple a reliable device for measuring wafer thickness.

Briefly, the invention is used on an apparatus for grinding an edge of a wafer or for polishing a wafer which has a pair of relatively movable vacuum chucks for engaging the wafer therebetween. The invention employs at least one sensor for measuring the distance between a movable one of the chucks and a fixed reference surface. The sensor is used to establish a standard measurement value corresponding to the distance between the movable chuck and the fixed reference surface when the movable chuck is in engagement with the other chuck without a wafer therebetween and to establish an actual measurement value for the distance between the movable chuck and the fixed reference surface when the movable chuck is in engagement with the wafer.

A calculator is also provided for determining a difference between the actual measurement value and a standard measurement value and displaying this difference as the thickness of the wafer.

The apparatus is constructed with means for selectively moving the movable chuck away from and towards the other of the chucks and means for selectively rotating the other chuck whereby the wafer can be rotated into different selective positions relative to the movable chuck in order to obtain multiple measurements of the thickness of the wafer.

The invention also provides a method measuring the thickness of a wafer while on a grinding or polishing machine employing a pair of chucks for contacting and holding the center of a wafer therebetween. In accordance with the method, the distance between one of the chucks when in engagement with the other chuck without a wafer therebetween is measured relative to a fixed reference surface in order to establish a standard measurement value. Thereafter, a wafer is placed between the chucks and the distance is again measured between the first chuck and the fixed reference surface in order to obtain an actual measurement value. A difference is then calculated between the actual measurement value and the standard measurement value and used as the thickness of the wafer.

The apparatus and method may be used to measure the average center thickness of all types of wafers. Material properties that effect optical or capacitive sensors are of no consequence.

The apparatus and method may employ one sensor or multiple sensors to measure the relative the displacements between the chucks. In either case, multiple measurements may be taken and an average of two or more thickness measurements may be made.

By rotating the wafer to obtain measurements at different points and averaging the thickness measurements compensates for any taper in the wafer and/or any wobble in the rotatable chuck on which the wafer is placed.

These and other objects and advantages of the invention will become more apparent from the following detailed description taken in conjunction with the accompanying drawings wherein.

Figure 1:
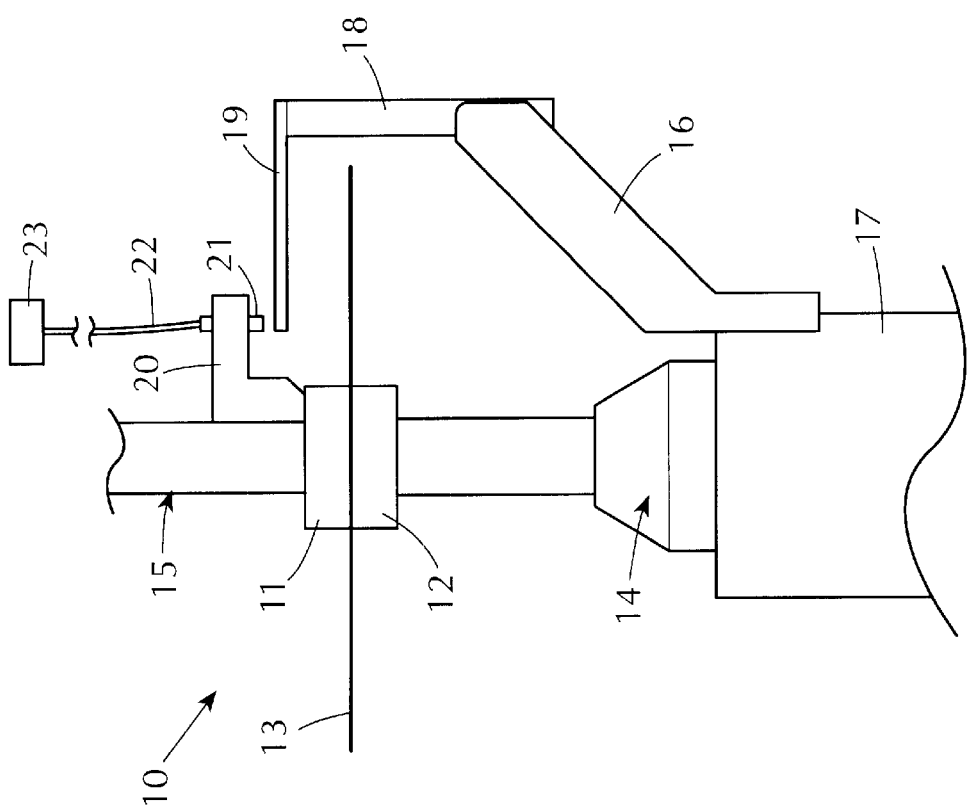
FIG. 1 illustrates, in part, a wafer grinding machine employing one sensor in accordance with the invention.

Referring to FIG. 1, the apparatus for measuring the thickness of a wafer is employed with an edge grinding or wafer polishing machine 10 of conventional structure. To this end, the machine 10 includes a pair of vacuum chucks 11, 12 for holding the center of a wafer 13 therebetween. The lower vacuum chuck 12, as viewed, is mounted for rotation about a vertical axis and a suitable means 14 is provided for selectively rotating the chuck 12.

The upper chuck 11, as viewed, is mounted on a conventional means 15 for selectively moving the chuck 11 towards and away from the rotatable chuck 12.

In accordance with the invention, a bracket 16 is secured on a fixed stationary housing 17 for the rotatable chuck 12 and carries an upstanding support arm 18 on which a plate or bar 19 is mounted in order to establish a fixed reference surface. In addition, a bracket 20 is secured to the movable chuck 11 to move therewith and carries a sensor 21. As indicated, the sensor 21 is disposed opposite, i.e. above the fixed reference surface 19, as viewed, and is electrically connected via a suitable line 22 to a calculator 23 for purposes as described below.

In order to obtain a thickness measurements, the two chucks 11, 12 are first brought together without a wafer therebetween. At this time, the sensor 21 senses the distance to the fixed reference surface 19 and emits a corresponding signal via the line 22 to the calculator 23 to establish a standard measurement value for the position of the movable chuck 11. For example, where the sensor 21 is a capacitive sensor, the sensor 21 measures the air gap between the sensor 21 and the fixed reference surface 19. Thereafter, the upper chuck 11 is raised and a wafer 13 placed on the lower chuck 12. The movable chuck 11 is then lowered onto the wafer 13 in order to engage the wafer 13 between the chucks 11, 12. At this time, the sensor 21 senses the distance to the fixed reference surface 19 and emits a corresponding signal via the line 22 to the calculator 23 so as to establish an actual measurement value of the distance between the movable chuck 11 and the fixed reference surface 19.

The signals representative of the standard measurement value and the actual measurement value delivered to the calculator 23 are compared and the difference between the two measurement values is displayed on a suitable read-out as the thickness of the wafer 13. In this sense, the relative displacement between the two chucks 11, 12 is measured and used as the thickness of the wafer 13.

The general formula used by the calculator 23 to calculate thickness using one sensor is as follows:

$$T=\Sigma(T_i-T_o)/n$$

Where:
T—is the calculated wafer thickness;
$T_o$—is the distance between the sensor 21 and the reference surface 19 when the two chucks 11, 12 are face-to-face without a wafer in-between;
Ti—is the distance between the sensor 21 and the reference surface 19 with a wafer 13 sandwiched between the chucks 11, 12. i.e. the $i^{th}$ sensor reading;
n—is the total number of sensor measurements to be averaged Alternatively, after obtaining a measurement, the upper chuck 11 may be moved upwardly away from the wafer 13 via the means 15 and the lower chuck 12 rotated 180°. The chuck 11 is then lowered to reengage the wafer 13 and a second thickness reading is obtained from the sensor 21. The calculator 23 is then able to obtain two thickness measurements for the wafer and is programmed to calculate an average between the two readings.

Figure 2:
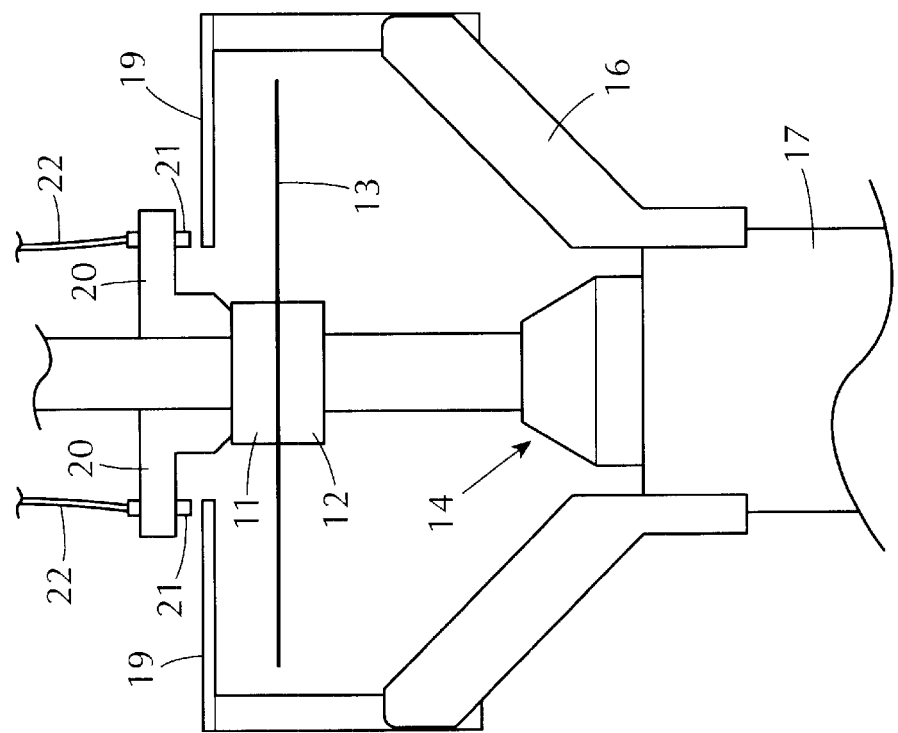
FIG. 2 illustrates a view similar to FIG. 1 of a machine employing two sensors in accordance with the invention.

Referring to FIG. 2 wherein like reference characters indicate like parts as above, use may be made of two sensors 21 mounted for movement with the upper chuck 11. In this embodiment, two thickness measurements may be taken 180° apart on the wafer 13. The wafer 13 need only be sandwiched the chucks 11, 12 once while the two sensors 21 measure simultaneously. This eliminates a need for rotating the wafer 13 and increases the through-put capability of the overall machine.

The general formula to calculate thickness using two sensors is as follows:

$$T=\Sigma[(T1_i-T1_o)+(T2_i-T2_o)]/(2n)$$

Where:
T—is the calculated wafer thickness
$T1_o$—is the distance between the 1st sensor 21 and the reference surface 19 when the two chucks are face to face without a wafer in-between.
$T2_o$—is the distance between 2nd sensor 21 and the reference surface 19 when the two chucks are face to face without a wafer in-between.
T1i—is the $i^{th}$ reading from the 1st sensor with the wafer sandwiched between the chucks
T2i—is the $i^{th}$ reading from the 2nd sensor with the wafer sandwiched between the chucks
n—is the total number of times the chucks sandwich the wafer and two simultaneous readings are taken.

A minimum of two thickness measurements as described above are necessary to achieve a high level of measurement accuracy. Higher accuracy can be achieved by averaging greater than two measurements equally spaced over 360 degree of wafer rotation. A single thickness measurement is not as accurate because non parallel surfaces pulled together by vacuum will deflect with their mounting structures.

Figure 4:
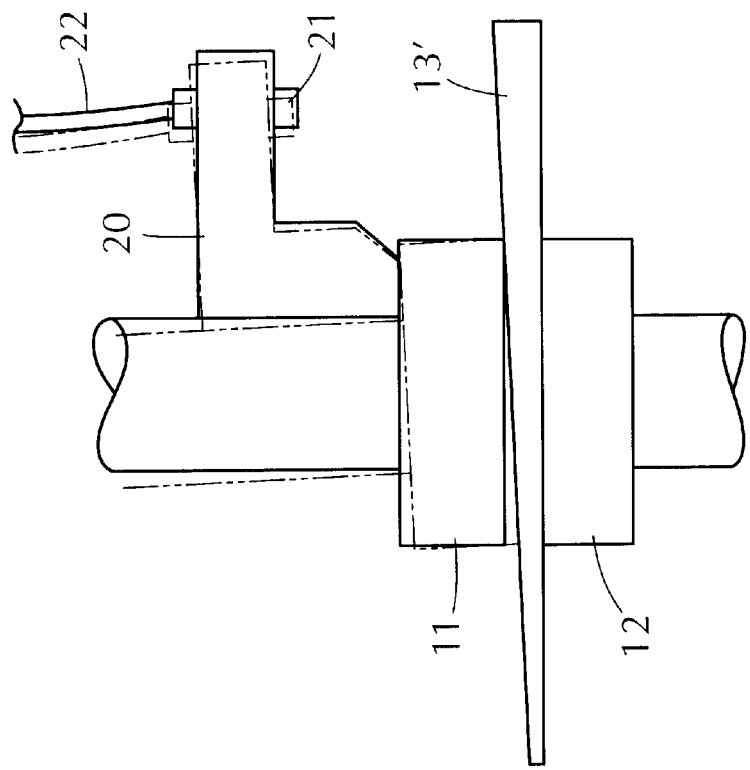
FIG. 4 illustrates a view of the apparatus of FIG. 3 during a thickness measurement of a wafer.
Figure 3:
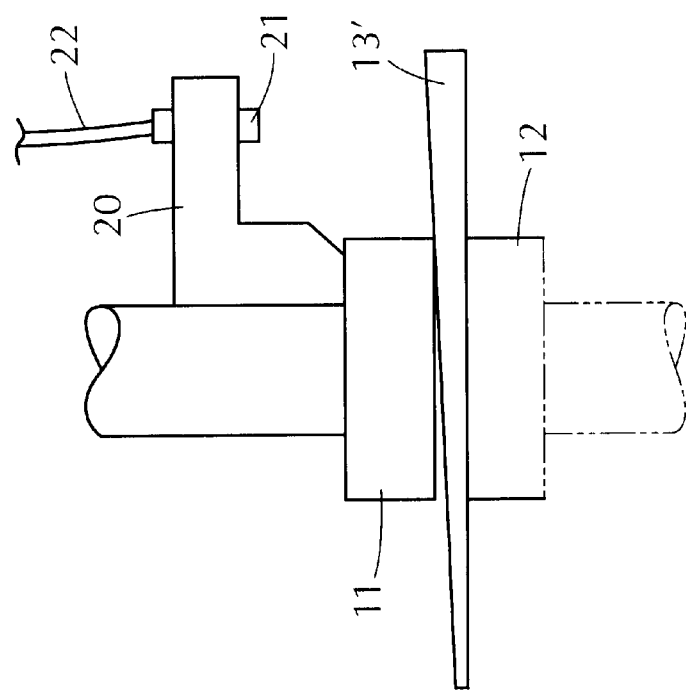
FIG. 3 illustrates a view of the vacuum chucks of FIG. 1 with a wafer having a tapered surface therebetween.

Referring to FIG. 3, wherein like reference characters indicate like parts as above, the measuring apparatus may be used to measure the thickness of a wafer 13' which has a taper. In this case, a wafer 13' is first roughly centered on the lower chuck 12 and vacuum is turn ON. The lower surface of the wafer 13' is held flat on the surface of the lower chuck 12. The upper chuck 11 then lowers until contacting the high side of the tapered wafer 13'. The opposite side of the chuck will not be in contact with the wafer. When the upper chuck 11 vacuum is turned ON, the chucks 11, 12 and their mounting structures deflect (as indicated in FIG. 4) in an effort to bring the mating surfaces flat to each other. The sensor 21 used to measure the gap between the chucks 11,12 is mounted on a bracket 20 on the upper chuck mounting structure. The deflection from the surfaces being pulled together causes the sensor 21 to move in a pivoting motion (See FIG. 4). If the high and low of the taper is in-line with the sensor 21, a maximum or minimum thickness reading will be obtained. As the lower chuck rotates the tapered wafer 360°, the thickness measurement varies in a sinusoidal pattern with a period of 360°. This is significant because two points 180° apart in a sinusoidal pattern will have the same amplitude but opposite direction. This means that averaging two thickness measurements, 180° apart on the lower chuck rotation, will compensate for the deflection caused by wafer taper.

Axial wobble is the axial displacement of a surface measured at a specified distance from the axis of rotation. In the case of the tapered wafer described above, the top surface of the wafer creates axial wobble as the lower chuck rotates the wafer. To complicate things further the lower chuck surface may also have axial wobble. However, the resulting combined wobble seen on the top surface of the wafer still produces a sinusoidal thickness measurement with a period of 360°. Therefore, pre-orientating the lower chuck 12 is not required for the thickness measurement. This increases throughput and makes the programming software less complicated.

The two chucks 11,12 used to perform the thickness measurement are similar to the conventional vacuum chucks used for wafer handling on edge grindings/edge polishers. The two chucks may be multi-functional and perform other operations, such as transporting wafers, holding wafers during the grinding operation or holding wafers during the alignment operation.

Instead of having the sensor 21 establish a standard measurement value as described above, a "zero" value may be obtained instead so that the sensor 21 is zeroed out. Thus, subsequent actual measurement values obtained by the sensor can be read directly as the thickness of a wafer.

The invention thus provides an apparatus and method for measuring the thickness of a wafer on an edge grinding machine or an edge polishing machine which is relatively simple and reliable. The apparatus may be readily retrofitted onto existing grinding and/or polishing and requires a minimum of parts.

The invention further provides an apparatus and method which can measure all types of wafers, whether the wafers are transparent or not. Further, the apparatus and method can be used for measuring the thickness of wafers having varying resistivity.

What is claimed is:

1. An apparatus for measuring a thickness of a wafer, said apparatus comprising;
    a pair of relatively movable vacuum chucks for engaging a wafer therebetween;
    at least one sensor for measuring the distance between a movable one of said chucks when in engagement with the wafer and a fixed reference surface to establish an actual measurement value; and
    a calculator for determining a difference between said actual measurement value and a standard measurement value as the thickness of the wafer.

2. An apparatus as set forth in claim 1 further comprising means for selectively moving said movable chuck away from and towards the other of said pair of chucks and means for selectively rotating said other chuck whereby the wafer is rotatable into different selective positions relative to said movable chuck to obtain multiple measurements of the thickness of the wafer.

3. An apparatus as set forth in claim 2 wherein said calculator is connected to said sensor to receive a sequence of actual measurement values therefrom and to obtain an average value therefrom as the thickness of the wafer.

4. An apparatus as set forth in claim 2 which comprises a pair of said sensors disposed 180° apart relative to said other chuck to obtain pairs of thickness measurements of the wafer to compensate for an axial wobble of said other chuck.

5. An apparatus as set forth in claim 1 wherein said standard measurement value corresponds to the distance between said movable chuck and said fixed reference surface when said movable chuck is in engagement with the other of said pair of chucks without a wafer therebetween.

6. In combination,
    a pair of relatively movable vacuum chucks for engaging a wafer therebetween;
    at least one sensor for measuring the distance between said chucks and for emitting a first signal with said movable chuck in engagement with the other of said chucks and a second signal with said movable chuck in engagement with a wafer on the other of said chucks; and
    a calculator for determining a difference between said signals and emitting a corresponding signal as the thickness of the wafer.

7. The combination as set forth in claim 6 further comprising means for selectively moving said movable chuck away from and towards the other of said chucks and means for selectively rotating said other chuck whereby the wafer is rotatable into different selective positions relative to said movable chuck to obtain multiple measurements of the thickness of the wafer.

8. The combination as set forth in claim 7 wherein said calculator is connected to said sensor to receive a sequence of actual measurement values therefrom and to obtain an average value therefrom as the thickness of the wafer.

9. The combination as set forth in claim 6 which comprises a pair of said sensors disposed 180° apart relative to said movable chuck to obtain pairs of thickness measurements of the wafer.

10. A method of measuring the thickness of a wafer comprising the steps of
    measuring the distance between a first movable chuck when in engagement with a second rotatable chuck without a wafer therebetween and a fixed reference surface to establish a standard measurement value;
    thereafter placing a wafer on the second rotatable chuck and moving the first chuck into engagement with the wafer;
    measuring the distance between the first chuck when in engagement with the wafer and said fixed reference surface to obtain an actual measurement value; and
    calculating a difference between said actual measurement value and said standard measurement value as the thickness of the wafer.

11. A method as set forth in claim 10 which further comprises the steps of simultaneously measuring the distance between the movable chuck and two fixed reference surfaces with the chucks in contact with each other and with the chucks engaging a wafer therebetween to obtain pairs of standard measurement values and pairs of actual measurement values, calculating the differences between said pairs of values and averaging said differences as the thickness of the wafer.

12. The method as set forth in claim 11 wherein said two fixed reference surfaces are disposed 180° apart relative to said rotatable chuck.

13. A method as set forth in claim 10 which further comprises the steps of moving the movable chuck away from the wafer, rotating the other chuck, thereafter moving the movable chuck into re-engagement with the wafer, measuring the distance between the movable chuck and the fixed reference surface to obtain a second actual measurement value, calculating the difference between the standard measurement value and the second actual measurement value, and averaging the two differences as the thickness of the wafer.

14. A method of measuring the thickness of a wafer disposed between a pair of vacuum chucks, said method comprising the steps of measuring the distance between a first chuck of said chucks when in engagement with a second chuck of said chucks without a wafer therebetween and a fixed reference surface to establish a standard measurement value;
    thereafter placing a wafer on the second rotatable chuck and moving the first chuck into engagement with the wafer;
    measuring the distance between the first chuck when in engagement with the wafer and said fixed reference surface to obtain an actual measurement value; and
    comparing said actual measurement value and said standard measurement value to obtain a difference therebetween as the thickness of the wafer.

15. An apparatus for measuring a thickness of a wafer without contacting the wafer, said apparatus comprising;

a pair of relatively movable vacuum chucks for engaging a wafer therebetween;

at least one sensor for measuring the distance between a movable one of said chucks when in engagement with the wafer and a fixed reference surface to establish an actual measurement value, said sensor being spaced from a wafer engaged between said chucks; and a calculator for determining a difference between said actual measurement value and a standard measurement value as the thickness of the wafer.

16. An apparatus as set forth in claim 15 further comprising means for selectively moving said movable chuck away from and towards the other of said pair of chucks and means for selectively rotating said other chuck whereby the wafer is rotatable into different selective positions relative to said movable chuck to obtain multiple measurements of the thickness of the wafer.

17. An apparatus as set forth in claim 15 wherein said standard measurement value corresponds to the distance between said movable chuck and said fixed reference surface when said movable chuck is in engagement with the other of said pair of chucks without a wafer therebetween.

18. A method of measuring the thickness of a wafer in a contact less manner comprising the steps of measuring the distance between a first movable chuck when in engagement with a second rotatable chuck without a wafer therebetween and a fixed reference surface to establish a standard measurement value;

thereafter placing a wafer on the second rotatable chuck and moving the first chuck into engagement with the wafer;

measuring the distance between the first chuck when in engagement with the wafer and said fixed reference surface to obtain an actual measurement value without contacting the wafer between the chucks; and calculating a difference between said actual measurement value and said standard measurement value as the thickness of the wafer.

19. A method as set forth in claim 18 which further comprises the steps of moving the movable chuck away from the wafer, rotating the other chuck, thereafter moving the movable chuck into re-engagement with the wafer, measuring the distance between the movable chuck and the fixed reference surface to obtain a second actual measurement value, calculating the difference between the standard measurement value and the second actual measurement value, and averaging the two differences as the thickness of the wafer.

* * * * *